United States Patent
Maeyama et al.

(10) Patent No.: US 7,163,978 B2
(45) Date of Patent: Jan. 16, 2007

(54) WATERBORNE ANTI-CHIPPING COATING COMPOSITION FOR AUTOMOBILES

(75) Inventors: Yoshihiro Maeyama, Sano (JP); Shinobu Nakagawa, Sano (JP); Masami Uemae, Sano (JP)

(73) Assignee: Nippon Carbide Kogyo Kabushiki Kaisha, Tokyo (JP)

( * ) Notice: Subject to any disclaimer, the term of this patent is extended or adjusted under 35 U.S.C. 154(b) by 58 days.

(21) Appl. No.: 10/479,460

(22) PCT Filed: Mar. 20, 2003

(86) PCT No.: PCT/JP03/03442

§ 371 (c)(1), (2), (4) Date: Dec. 2, 2003

(87) PCT Pub. No.: WO03/080750

PCT Pub. Date: Oct. 2, 2003

(65) Prior Publication Data

US 2004/0167271 A1   Aug. 26, 2004

(30) Foreign Application Priority Data

Mar. 22, 2002 (JP) ............................. 2002-081764

(51) Int. Cl.
C08J 3/03 (2006.01)
C08J 3/05 (2006.01)

(52) U.S. Cl. ............ 524/501; 524/515; 524/522; 524/523; 524/525

(58) Field of Classification Search ............ 524/501, 524/515, 522, 523, 525
See application file for complete search history.

(56) References Cited

U.S. PATENT DOCUMENTS 5,424,355 A * 6/1995 Uemae et al. .............. 524/507

6,451,141 B1 * 9/2002 Krobb et al. ................ 156/71

FOREIGN PATENT DOCUMENTS

| DE | 299472 A7 * | 4/1992 |
|---|---|---|
| JP | 53-64287 | 6/1978 |
| JP | 54-52139 | 4/1979 |
| JP | 57-180617 | 11/1982 |
| JP | 59-75954 | 4/1984 |
| JP | 59-129213 | 7/1984 |
| JP | 62-230868 | 10/1987 |
| JP | 63-10678 | 1/1988 |
| JP | 63-172777 | 7/1988 |
| JP | 2-28269 | 1/1990 |
| JP | 6-73310 | 3/1994 |
| JP | 6-73311 | 3/1994 |
| JP | 2001-200181 | 7/2001 |

OTHER PUBLICATIONS

Derwent Abstract No. 1992-308660 for DD 299472 A7 (Apr. 23, 1992).*
Full English-language translation of DD 299 472 A7, 1992.*

* cited by examiner

Primary Examiner—Vasu Jagannathan
Assistant Examiner—Vickey Ronesi
(74) Attorney, Agent, or Firm—Young & Thompson

(57) ABSTRACT

A waterborne coating composition comprising fine polymer particles dispersed in an aqueous medium and an inorganic filler, wherein the fine polymer particles comprise (A) 50 to 90% by weight of synthetic rubber polymer particles containing 50 to 90% by weight of a repeating unit derived from a conjugated diolefin monomer and having a glass transition temperature of −20° C. or lower and (B) 10 to 50% by weight of acrylic polymer particles containing 50% by weight or more of a repeating unit derived from an acrylic ester and/or a methacrylic ester and having a glass transition temperature of 0° C. or lower.

15 Claims, No Drawings

WATERBORNE ANTI-CHIPPING COATING COMPOSITION FOR AUTOMOBILES

TECHNICAL FIELD

The present invention relates to a waterborne coating composition useful as a mastic coating, a sound proofing coating, a vibration damping coating, a caulking material, and the like. More particularly, it relates to an anti-chipping waterborne coating composition mainly comprising a mixture of synthetic rubber polymer particles and acrylic polymer particles which is used to protect exterior sheet metal parts of vehicles, especially of automobiles, such as lower body panels, wheel housings, chassiz, gas tanks and suspensions, from scratch called "chipping damages" and caused by. pinging gravel or stones, etc., which provides a coating film with excellent performance properties, such as anti-chipping properties, adhesion to metal workpieces, uniformity and surface smoothness, water resistance, gasoline resistance, impact resistance, and sound proofing properties, and of which left-over after use can be mixed with a fresh one for reuse without disposal (such properties will sometimes be referred to as reusability).

BACKGROUND ART

Known waterborne anti-chipping coatings used for exterior sheet metal parts of vehicles such as automobiles include those comprising a water-based resin dispersion, such as a rubber latex or an acrylic copolymer emulsion, as a vehicle and an inorganic filler, such as calcium carbonate or talc. These coatings are often thickened appropriately and applied to a metal substrate with an airless spray, etc.

A waterborne coating of that type is required to have the following properties. (1) To have an adjustable viscosity for ease of application. (2) To provide a relatively thick coating film in a single pass which dries without developing blisters or cracks. (3) To provide a coating film with excellent adhesion to a sheet metal workpiece (metal substrate). (4) To provide a coating film which has high rubber elasticity thereby exhibiting excellent anti-chipping performance and, if scratched, minimizes corrosion of the underlying metal substrate. (5) To provide a coating film which maintains sufficient impact resistance even under a low temperature condition as in cold climates. (6) To have reusability, which is particularly required in the light of the recent concerns for environmental conservation and the recent severe economic situation. That is, the coating which has adhered to the wall, etc. of a coating booth after coating in a considerable amount should be collected and made reusable by addition of a fresh one. The reusability improves usability of the coating, reduces the amount and/or the concentration of wastewater resulting from coating booth cleaning, and saves the cost for wastewater disposal.

Of the above-described waterborne coatings those based on aqueous acrylic copolymer resin dispersions are disclosed, e.g., in JP-A-53-64287, JP-A-59-75954, JP-A-62-230868, JP-A-63-10678, and JP-A-63-172777.

These waterborne acrylic coatings generally exhibit relatively satisfactory viscosity characteristics and are excellent in airless sprayability, capable of forming a relatively thick coating film in a single pass, and reusable to some extent. Nevertheless many of them cannot be seen as sufficient in adhesion to sheet metal workpieces. In addition, a Pb-Sn alloy-plated steel sheet (called a terne sheet), which has been used as a sheet metal worked substrate in the manufacture of automobiles, etc., has now been regarded problematic in terms of toxicity of lead and being replaced with aluminum-plated steel sheets, tin-zinc-plated steel plates, and the like. Compared with conventional terne sheets, these metal substrates are apt to have insufficient adhesion to coatings. The conventional waterborne coatings based on an acrylic copolymer resin dispersion often show extremely poor adhesion to such metal substrates.

On the other hand, anti-chipping waterborne coatings comprising a rubber latex as a vehicle are disclosed, e.g., in JP-A-57-180617, JP-A-59-75954, and JP-A-59-129213.

The latex-based anti-chipping waterborne coatings described in the publications have difficulty in forming a thick film in a single pass because of their viscosity. Thickening in an attempt to solve the problem results in unfavorable viscosity behavior, which causes difficulty in providing a uniform coating film by spray coating, etc. In particular, the coating film just formed is liable to slip and run on a vertical substrate. Moreover, because the latex-based anti-chipping waterborne coatings often have insufficient mechanical stability, little reusability is expected.

Anti-chipping waterborne coatings using a combination of a rubber latex and other copolymers as a vehicle are also known. For example, JP-A-54-52139 proposes using a vehicle comprising a styrene-butadiene copolymer resin and a specified amount of a vinyl chloride-vinyl acetate-unsaturated dibasic acid copolymer resin and a specified amount of a low-molecular liquid polymer. A working example of the publication uses the vinyl chloride-vinyl acetate-unsaturated dibasic acid copolymer resin in powder form. It has turned out, however, that the copolymer resin powder is not easy to disperse and that the resulting coat has insufficient adhesion to a sheet metal workpiece and insufficient anti-chipping properties.

JP-A-2-28269 proposes using, as a base resin (vehicle component) of an anti-chipping waterborne coating, a copolymer prepared by emulsion polymerization of styrene, butadiene, and an acrylic monomer which has a glass transition temperature of 0° C. or lower and a butadiene content of 5 to 50 parts by weight per 100 parts by weight of the copolymer. According to a working example of the publication, the base resin is prepared by emulsion polymerizing an acrylic monomer in the presence of a styrene-butadiene rubber latex. The inventors of the present invention attempted to prepare the copolymer in accordance with the working example. What they obtained as a result was a rigid and brittle copolymer with no such rubbery elasticity as expected. This is because the emulsion polymerization of an acrylic monomer in the presence of a styrene-butadiene rubber latex is accompanied by graft polymerization of the acrylic monomer to the residual double bonds originated in the butadiene units of the rubber latex.

Application of an anti-chipping coating to automotive parts other than the body, e.g., chassiz, gas tanks, and suspensions, is usually carried out on a separate line from a body coating line. To reduce automobile manufacturing costs, attempts have recently been made to bake the coating film on that line at relatively low temperatures, e.g., 100° C. or lower. The attempts have turned out to be advantageous for practically averting blister development but to give rise another problem that the adhesion of the coating to these parts is reduced further.

DISCLOSURE OF THE INVENTION

The present inventors have conducted extensive study to provide a waterborne coating composition having well-balanced various properties required as an anti-chipping coating, such as reusability of left-over, coating properties with an airless spray, etc., capability of forming a uniform and smooth film, excellent adhesion to metal substrates including not only conventional Pd—Sn alloy plated steel plates (teme sheets) but those which have recently come to be in wide use, such as Alplated steel plates and Sn—Zn plated steel plates, and excellent dry, water-resistant or solvent-resistant anti-chipping performance.

As a result, they have found that the aforementioned problems are all settled by using, as a vehicle component of a waterborne coating composition, an aqueous dispersion of a synthetic rubber polymer which is prepared by copolymerizing a conjugated diolefin (e.g., butadiene) and methyl methacrylate, acrylonitrile, styrene, etc. and has a glass transition temperature (Tg) of −20° C. or lower (e.g., about −40° C.) in combination with a specific amount of an aqueous dispersion of an acrylic polymer having a Tg of 0° C. or lower (e.g., about −30° C).

The present invention provides a waterborne coating composition comprising fine polymer particles dispersed in an aqueous medium and an inorganic filler, which is characterized in that the fine polymer particles comprise:

(A) 50 to 90% by weight of synthetic rubber polymer particles containing 50 to 90% by weight of a repeating unit derived from a conjugated diolefin monomer and having a glass transition temperature of −20° C. or lower and (B) 10 to 50% by weight of acrylic polymer particles containing 50% by weight or more of a repeating unit derived from an acrylic ester and/or a methacrylic ester and having a glass transition temperature of 0° C. or lower.

The terminologies or phrases "fine polymer particles dispersed in an aqueous medium", "synthetic rubber polymer particles" and "acrylic polymer particles" as used herein are intended to mean fine polymer particles dispersed in an aqueous medium, of which the average particle size is usually 1000 nm or smaller, preferably about 50 to 800 nm, and are not intended to mean only those polymer particles obtained by emulsion polymerization.

BEST MODE FOR CARRYING OUT THE INVENTION

The waterborne coating composition of the present invention will be described in greater detail.

(A) Synthetic Rubber Polymer Particles

The synthetic rubber polymer particles (A), an essential vehicle component of the waterborne coating composition of the invention, comprise a copolymer with rubbery elasticity containing 50 to 90% by weight, preferably 50 to 80% by weight, still preferably 55 to 75% by weight, of a repeating unit derived from a conjugated diolefin monomer based on the weight of the synthetic rubber polymer.

Such a synthetic rubber polymer is prepared in accordance with synthetic rubber polymer latices production processes known per se in the art. For example, it is formed by aqueous emulsion polymerization, under pressure, of (a1) a conjugated diolefin monomer and (a2) a methacrylic ester monomer, a vinyl cyanide monomer and/or an aromatic vinyl monomer, preferably together with (a3) a monomer having a carboxyl group in the molecule thereof (hereinafter sometimes referred to as a carboxyl-containing monomer) and, if desired, (a4) other copolymerizable monomer(s).

The conjugated diolefin monomer (a1) includes one or more monomers selected from butadiene, isoprene, chloroprene, etc., with butadiene being particularly preferred.

The preferable copolymerization ratio of the conjugated diolefin monomer (a1) is usually 50 to 90% by weight, still 55 to 80% by weight, particularly 60 to 70% by weight, per 100% by weight of the synthetic rubber polymer particles. Copolymerization ratios at or below the upper limit are preferred for obtaining a coating film having sufficient rubber elasticity. Copolymerization ratios at or above the lower limit are preferred for assuring sufficient adhesion of a coating film to a substrate.

As to the methacrylic ester monomer, vinyl cyanide monomer and/or aromatic vinyl monomer (a2), the methacrylic ester monomer includes methyl methacrylate. The vinyl cyanide monomer includes acrylonitrile and methacrylonitrile, with acrylonitrile being preferred. The aromatic vinyl monomer includes styrene, α-methylstyrene, vinyltoluene, and ethylvinylbenzene, with styrene being preferred.

The methacrylic ester monomer, vinyl cyanide monomer and/or aromatic vinyl monomer (a2) can be used either individually or as a mixture of two or more thereof. From the viewpoint of adhesion to substrate and rubber elasticity of the resulting coating film, a combined use of two or more of them is preferred, and a combined use of three or more of them is still preferred. It is desirable for the monomer component (a2) to contain a methacrylic ester monomer, especially methyl methacrylate, as an essential monomer.

The preferable total copolymerization ratio of the monomer component (a2) is usually 10 to 50% by weight, still 20 to 40% by weight, particularly 25 to 35% by weight, per 100% by weight of the synthetic rubber polymer particles. Copolymerization ratios not more than the upper limit are preferred for obtaining a coating film with sufficient rubber elasticity. Copolymerization ratios not less than the lower limit are preferred for assuring sufficient adhesion of a coating film to a substrate.

The carboxyl-containing monomer (a3), which is preferably used, includes α,β-ethylenically unsaturated monomers containing one or two carboxyl groups, in whichever of its forms (free form, salt form and anhydride form), per molecule. Examples are α,β-unsaturated monocarboxylic acids having 3 to 5 carbon atoms, such as acrylic acid, methacrylic acid, and crotonic acid; α,β-unsaturated dicarboxylic acids having 4 or 5 carbon atoms, such as citraconic acid, itaconic acid, maleic acid, and fumaric acid, or their anhydrides or monoalkyl esters having 1 to 12 carbon atoms in the alkyl moiety (e.g., monoethyl esters and mono-n-butyl esters); and salts of the recited carboxylic acids (e.g., ammonium salts and alkali metal salts). These monomers can be used either individually or as a combination of two or more thereof. Particularly preferred of the carboxyl-containing monomers are acrylic acid, methacrylic acid, and itaconic acid.

The preferable copolymerization ratio of the carboxyl-containing monomer (a3) is usually 0.3 to 10% by weight, still 1 to 7% by weight, particularly 2 to 5% by weight, per 100% by weight of the synthetic rubber polymer particles. Copolymerization ratios not more than the upper limit are preferred for obtaining a coating film with sufficient water resistance. Copolymerization ratios not less than the lower limit are preferred for assuring excellent coating properties with an airless spray, etc. and sufficient mechanical stability required during application.

The synthetic rubber emulsion polymer particles which are used in the present invention are produced by copolymerizing (a1) the conjugated diolefin monomer and (a2) the methacrylic ester monomer, vinyl cyanide monomer and/or aromatic vinyl monomer as essential monomer components preferably together with (a3) the carboxyl-containing monomer. As is often adopted in the manufacture of synthetic rubber polymer latices, monomer(s) (a4) which are other than the monomers (a1), (a2) and (a3) and copolymerizable with the monomers (a1), (a2) and (a3) (hereinafter sometimes referred to as a comonomer (a4)) can be copolymerized if desired.

Examples of such comonomers (a4) are listed below.

(1) Acrylic Esters and Methacrylic Esters other than the Monomer (a2)

Esters with alkyl having 1 to 18 carbon atoms, such as methyl acrylate, ethyl acrylate, n-butyl acrylate, isobutyl acrylate, n-octyl acrylate, isooctyl acrylate, 2-ethylhexyl acrylate, isononyl acrylate, methyl methacrylate, ethyl methacrylate, n-butyl methacrylate, isobutyl methacrylate, n-hexyl methacrylate, n-octyl methacrylate, and n-dodecyl methacrylate.

(2) Radical Polymerizable Unsaturated Monomers having at Least One Crosslinking Functional Group Amido- or substituted amido-containing monomers, such as acrylamide, methacrylamide, diacetoneacrylamide, N-methylolacrylamide, N-methylolmethacrylamide, N-n-butoxymethylacrylamide, N-isobutoxymethylacrylamide, N,N-dimethylacrylamide, and N-methylacrylamide;

Amino- or substituted amino-containing monomers, such as aminoethyl acrylate, N,N-dimethylaminoethyl acrylate, N,N-diethylaminoethyl acrylate, N,N-dimethylaminoethyl methacrylate, and N,N-diethylaminoethyl methacrylate;

Hydroxyl-containing monomers, such as 2-hydroxyethyl acrylate, 2-hydroxypropyl acrylate, 2-hydroxyethyl methacrylate, 2-hydroxypropyl methacrylate, allyl alcohol, methallyl alcohol, polyethylene glycol monoacrylate, and polyethylene glycol monomethacrylate;

Lower alkoxy-containing monomers, such as 2-methoxyethyl acrylate, 2-ethoxyethyl acrylate, 2-n-butoxyethyl acrylate, 2-methoxyethoxyethyl acrylate, 2-ethoxyethoxyethyl acrylate, 2-n-butoxyethoxyethyl acrylate, 2-methoxyethyl methacrylate, 2-ethoxyethyl methacrylate, 2-n-butoxyethyl methacrylate, 2-methoxyethoxyethyl methacrylate, 2-ethoxyethoxyethyl methacrylate, 2-n-butoxyethoxyethyl methacrylate, methoxypolyethylene glycol monoacrylate, and methoxypolyethylene glycol monomethacrylate;

Epoxy-containing monomers, such as glycidyl acrylate, glycidyl methacrylate, glycidyl allyl ether, and glycidyl methallyl ether;

Mercapto-containing monomers, such as allyl mercaptan;

Monomers having a silicon-containing group, such as vinyltrichlorosilane, vinyltribromosilane, vinyltrimethoxysilane, vinyltriethoxysilane, vinyltri-n-propoxysilane, vinyltriisopropoxysilane, vinyltri-n-butoxysilane, vinyltris(2-methoxyethoxy)silane, vinyltris(2-hydroxymethoxyethoxy)silane, vinyltriacetoxysilane, vinyldiethoxysilanol, vinylethoxysilanediol, vinylmethyldiethoxysilane, vinyldimethylethoxysilane, vinylmethyldiacetoxysilane, allyltrimethoxysilane, allyltriethoxysilane, 3-methacryloxypropyltrimethoxysilane, 3-acryloxypropyltriethoxysilane, 3-methacryloxypropyltris(2-methoxyethoxy)silane, 3-methacryloxypropylmethyldiethoxysilane, 3-methacryloxypropyldimethylethoxysilane, 3-acryloxypropyldimethylmethoxysilane, and 2-acrylamidoethyltriethoxysilane; and Monomers having two or more radical polymerizable unsaturated groups, such as divinylbenzene, diallyl phthalate, triallyl cyanurate, triallyl isocyanurate, ethylene glycol di(meth)acrylate, 1,2-propylene glycol di(meth)acrylate, 1,3-propylene glycol di(meth)acrylate, 1,4-butanediol di(meth)acrylate, 1,6-hexanediol di(meth)acrylate, neopentyl glycol di(meth)acrylate, trimethylolpropane tri(meth)acrylate, and allyl (meth)acrylate.

The preferable copolymerization ratio of the comonomer (a4) is usually 0 to 20% by weight, still 0 to 15% by weight, particularly 0 to 10% by weight, per 100% by weight of the synthetic rubber polymer particles. Copolymerization ratios not more than the upper limit are preferred for assuring excellence in rubber elasticity and adhesion to substrate of the resulting coating film.

The synthetic rubber polymer particles (A) are synthesized similarly to synthetic rubber latices production processes known per se. They are produced by emulsion polymerization of monomer components (a1) to (a4) in an aqueous medium in the presence of a surface active agent and, if necessary, a protective colloid at a temperature of about 30 to about 100° C., preferably about 40 to about 90° C., usually under pressure.

The surface active agent to be used can be of any type, nonionic, anionic, cationic or amphoteric.

Useful nonionic surface active agents include polyoxyalkylene alkyl ethers, e.g., polyoxyethylene lauryl ether and polyoxyethylene stearyl ether; polyoxyalkylene alkylphenyl ethers, e.g., polyoxyethylene octylphenyl ether and polyoxyethylene nonylphenyl ether; sorbitan fatty acid esters, e.g., sorbitan monolaurate, sorbitan monostearate, and sorbitan trioleate; polyoxyalkylene sorbitan fatty acid esters, e.g., polyoxyethylene sorbitan monolaurate; polyoxyalkylene fatty acid esters, e.g., polyoxyethylene monolaurate and polyoxyethylene monostearate; glycerol fatty acid esters, e.g., glycerol monooleate and glycerol monostearate; and polyoxyethylene polyoxypropylene block copolymers.

Useful anionic surface active agents include fatty acid salts, e.g., sodium stearate, sodium oleate, and sodium laurate; alkylarylsulfonic acid salts, e.g., sodium dodecylbenzenesulfonate; alkylsulfuric ester salts, e.g., sodium laurylsulfate; alkylsulfosuccinic ester salts and derivatives thereof, e.g., sodium monooctylsulfosuccinate, sodium dioctylsulfosuccinate, and sodium polyoxyethylene laurylsufosuccinate; polyoxyalkylene alkyl ether sulfuric ester salts, e.g., sodium polyoxyethylene lauryl ether sulfate; and polyoxyalkylene alkylaryl ether sulfuric ester salts, e.g., sodium polyoxyethylene nonylphenyl ether sulfate.

Useful cationic surface active agents include alkylamine salts, e.g., laurylamine acetate; quaternary ammonium salts, e.g., lauryltrimethylammonium chloride and alkylbenzyldimethylammonium chlorides; and polyoxyethylalkylamines. Useful amphoteric surface active agents include alkyl betaines, such as lauryl betaine.

Also useful are the above-enumerated surface active agents with part of their alkyl hydrogen atoms replaced with fluorine and those having a radical copolymerizable unsaturated bond introduced into the molecular structure, namely, reactive surface active agents.

From the standpoint of suppressing agglomeration during emulsion polymerization, preferred of these surface active agents are: polyoxyalkylene alkyl ethers and polyoxyalkylene alkylphenyl ethers as nonionic ones; and alkylarylsulfonic acid salts, alkylsulfate salts, alkylsulfosuccinic ester salts or derivatives thereof, polyoxyalkylene alkyl ether sulfuric ester salts, polyoxyalkylene alkylphenyl ether sulfuric ester salts as anionic ones. The surface active agents can be used either individually or as an appropriate combination thereof.

The amount of the surface active agent to be added is subject to variation depending on the kind. Generally speaking, it ranges from about 0.1 to about 10 parts by weight per 100 parts by weight of the synthetic rubber polymer particles, i.e., the total of the monomer components (a1) to (a4). A recommended amount is about 1 to 6 parts by weight, particularly about 1 to 4 parts by weight, in view of better results such as aqueous emulsion polymerization stability, storage stability of the resulting aqueous dispersion of synthetic rubber polymer particles (hereinafter sometimes referred to as a synthetic rubber polymer emulsion), and adhesion of the resulting anti-chipping waterborne coating composition to a substrate, e.g., a sheet metal workpiece.

The protective colloid which can be used in the preparation of the synthetic rubber polymer particles includes polyvinyl alcohols, such as partially saponified polyvinyl alcohol, completely saponified polyvinyl alcohol, and modified polyvinyl alcohol; cellulose derivatives, such as hydroxyethyl cellulose, hydroxypropyl cellulose, and carboxymethyl cellulose; and naturally occurring polysaccharides, such as guar gum.

The amount of the protective colloid to be used is not strictly limited and is subject to variation according to the kind. In general, it is up to about 3 parts by weight per 100 parts by weight of the total of the monomer components (a1) to (a4).

The emulsion polymerization of the monomer components (a1) to (a4) is carried out using a polymerization initiator. Usable polymerization initiators include persulfates, e.g., ammonium persulfate, sodium persulfate, and potassium persulfate, organic peroxides, e.g., t-butyl hydroperoxide, cumene hydroperoxide and p-menthane hydroperoxide, and hydrogen peroxide. They can be used either individually or as a combination of two or more thereof.

The amount of the polymerization initiator to be used is not strictly limited and is subject to wide variation according to the kind and reaction conditions, etc. In general, it is preferably about 0.05 to about 3 parts by weight, still preferably about 0.1 to about 2 parts by weight, particularly preferably about 0.1 to about 1.5 parts by weight, per 100 parts by weight of the total of the monomer components (a1) to (a4).

In carrying out the emulsion polymerization, a reducing agent can be used in combination if desired. Usable reducing agents include organic reducing compounds such as ascorbic acid, tartaric acid, citric acid, and glucose, and inorganic reducing compounds, such as sodium thiosulfate, sodium sulfite, sodium bisulfite, sodium metabisulfite. The amount of the reducing agent is not particularly limited and usually ranges from about 0.05 to about 3 parts by weight per 100 parts by weight of the total of the monomer components (a1) to (a4).

If desired, a chain transfer agent can be used in carrying out the emulsion polymerization. Useful chain transfer agents include cyanoacetic acid; alkyl cyanoacetate having 1 to 8 carbon atoms in the alkyl moiety; bromoacetic acid; alkyl bromoacetate having 1 to 8 carbon atoms in the alkyl moiety; polycyclic aromatic compounds, e.g., anthracene, phenanthrene, fluorene, and 9-phenylfluorene; aromatic nitro compounds, e.g., p-nitroaniline, nitrobenzene, dinitrobenzene, p-nitrobenzoic acid, p-nitrophenol, and p-nitrotoluene; benzoquinone and derivatives thereof, e.g., 2,3,5,6-tetramethyl-p-benzoquinone; borane derivatives, e.g., tributylborane; halogenated hydrocarbons, e.g., carbon tetrabromide, carbon tetrachloride, 1,1,2,2-tetrabromoethane, tribromoethylene, trichloroethylene, bromotrichloromethane, tribromomethane, and 3-chloro-1-propene; aldehydes, e.g., chloral and furaldehyde; alkylmercaptans having 1 to 18 carbon atoms, e.g., n-dodecylmercaptan; aromatic mercaptans, e.g., thiophenol and toluenemercaptan; mercaptoacetic acid; alkyl mercaptoacetates having 1 to 10 carbon atoms in the alkyl moiety; hydroxyalkylmercaptans having 1 to 12 carbon atoms, e.g., 2-mercaptoethanol; and terpenes, e.g., pinene and terpinolene.

The amount of the chain transfer agent, if used, preferably ranges from about 0.005 to about 5 parts by weight per 100 parts by weight of the total of the monomer components (a1) to (a4).

The synthetic rubber polymer emulsion (latex) thus obtained by the emulsion polymerization can usually have a solid content of 10 to 70% by weight, preferably 30 to 60% by weight, still preferably 40 to 60% by weight. A preferable viscosity of the emalsion is usually less than 10,000 cps, particularly about 50 to about 5,000 cps, as measured with a Brookfield rotational viscometer at 25° C. and 20 rpm.

It is desirable for the emulsion to have a pH of 2 to 10, preferably 5 to 9. The pH can be adjusted with, for example, aqueous ammonia, an aqueous amine solution or an aqueous alkali hydroxide solution.

The synthetic rubber polymer particles (A) used in the waterborne coating composition of the invention has a Tg of −20° C. or lower, preferably −50° to −30° C., still preferably −45° to −35° C. A waterborne coating composition prepared by using synthetic rubber polymer particles whose Tg is higher than that upper limit tends to form a coating film with insufficient adhesion to a substrate. A Tg at or higher than the above lower limit is preferred for forming a coating film having excellent anti-chipping properties.

The glass transition temperature (Tg) of polymer particles as referred to in the present invention is a value measured as follows.

Glass Transition Temperature (Tg):

About 10 mg of a (co)polymer emulsion is weighed out, put into a cylindrical cell made of about 0.05 mm thick aluminum foil and having an inner diameter of about 5 mm and a depth of about 5 mm, and dried at 100° C. for 2 hours to prepare a specimen. The specimen is analyzed on a differential scanning calorimeter, SSC-5000 available from Seiko Instruments Inc., by heating from −150° C. at a rate of 10° C./min, measuring the change of specific heat capacity due to glass transition, and deciding the Tg from the result.

It is generally preferred for the synthetic rubber polymer particles to have a gel content of 70 to 95% by weight, particularly 75 to 90% by weight. With a gel content not lower than that lower limit, the coating composition forms a thick coating film which can be heat dried without blistering. With a gel content at or below that upper limit, the coating composition provides a coating film which is highly elastic and thereby exhibiting excellent anti-chipping performance.

The gel content of the synthetic polymer particles (A) as referred to in the present invention is a value measured as follows.

Gel Content:

A film of a synthetic rubber polymer emulsion (or an acrylic polymer emulsion hereinafter described) is prepared by room temperature drying. The film is poured into about 200 to 800 times of toluene, allowed to stand for 48 hours, and removed by filtration using No. 2 filter paper. The filtrate is dried under reduced pressure at 70° C. and weighed to obtain a toluene soluble content (wt %) of the polymer emulsion film. The toluene soluble content (wt %) is subtracted from 100 wt % to give a toluene insoluble content (wt %), which is the gel content.

It is generally desirable that the synthetic rubber polymer particles (A) dispersed in the emulsion prepared as described above have an average particle size (hereinafter sometimes referred to simply as a "particle size") of 100 to 300 nm, particularly 120 to 250 nm. The particle size of the emulsion polymer particles can be controlled by, for example, proper selection of the kind and the amount of a surface active agent to be used, the polymerization temperature, and the like.

The average particle size of dispersed particles as referred to in the present invention is a weight average particle size measured with a laser diffraction particle size analyzer, Master Sizer 2000 (supplied by Sysmex Corp.).

Commercially available products are also useful as the synthetic rubber particles (A) as well as one prepared by the above-described process, including styrene-butadiene synthetic rubber latices (hereinafter sometimes referred to as "SBRs") sold under trade names of LX-407C from Zeon Corp., SN-318, SN-534, SN-562, and J-1666 from Sumitomo Dow Ltd., SK-80 from Takeda Chemical Industries, Ltd., L-2001 and L-2337 from Asahi Chemical Industry Co., Ltd., and Polylac 707 from Mitsui Toatsu Chemicals, Inc.; and acrylonitrile-butadiene synthetic rubber latices (hereinafter sometimes referred to as "NBRs") sold under trade names of Nippol 1571, Nippol 1551, and Nippol 1562 from Zeon Corp.

(B) Acrylic Polymer Particles:

The acrylic polymer particles (B) which are used in combination with the synthetic rubber polymer particles (A) as a vehicle component of the waterborne coating composition of the present invention usually comprise 50% by weight or more, preferably 60 to 99% by weight or more, still preferably 70 to 98% by weight or more, of a repeating unit derived from an acrylic ester and/or a methacrylic ester per 100% by weight of the acrylic polymer particles (B).

More specifically, the acrylic polymer particles (B) which are preferably used in the invention can be produced by aqueous emulsion polymerization of the following monomers (b1) to (b4):

(b1) 50 to 90% by weight of an acrylic ester represented by formula (1):

$$H_2C=CR^1HCOOR^2 \quad (1)$$

wherein $R^1$ represents H or a methyl group; and $R^2$ represents a straight-chain or branched alkyl group having 4 to 10 carbon atoms,
of which a homopolymer has a glass transition temperature (Tg) of −50° C. or lower, (b2) 0.3 to 10% by weight of a monomer having a carboxyl group in the molecule thereof, (b3) 1.5 to 15% by weight of a monomer having a hydroxyl group in the molecule thereof, and (b4) 8.2 to 48.2% by weight of a comonomer which is other than the monomers (b1), (b2) and (b3) and copolymerizable with the monomers (b1), (b2) and (b3), the total of the monomers (b1) to (b4) being taken as 100% by weight.

The monomer (b1) includes n-butyl acrylate, 2-ethylhexyl acrylate, n-octyl acrylate, isooctyl acrylate, n-nonyl acrylate, and isononyl acrylate. Preferred of them are n-butyl acrylate, 2-ethylhexyl acrylate, and isooctyl acrylate. These acrylic esters can be used either individually or as a combination of two or more thereof.

The copolymerization ratio of the monomer (b1) should be 50 to 90% by weight as stated and is preferably 60 to 88% by weight, still preferably 70 to 84% by weight. Too high a copolymerization ratio exceeding the above upper limit tends to result in reduced anti-chipping properties of the resulting coating film. Too low a copolymerization ratio lower than the lower limit tends to result in reduced adhesion to a substrate.

The "glass transition temperature (Tg) of a homopolymer" as used herein is the "glass transition temperature of a monomer" described in L.E. Nielsen, *Mechanical Properties of Polymers and Composites* (*Kobunshino Rikigakuteki Seishitu*, a Japanese translation by Shigeharu Onogi, pp. 11–35).

The carboxyl-containing monomer (b2) includes those enumerated as the carboxyl-containing ethylene monomer (a3) with respect to the preparation of the synthetic rubber polymer. Similarly as for the monomer (a3), preferred examples of the monomer (b2) are acrylic acid, methacrylic acid, and itaconic acid. The copolymerization ratio of the monomer (b2) should be 0.3 to 10% by weight as stated and is preferably 0.5 to 5% by weight, still preferably 1 to 3% by weight. If the copolymerization ratio exceeds the upper limit, the coating film is liable to blistering on heat drying, and a thick film is hard to obtain. If the copolymerization ratio is less than the lower limit, the resulting waterborne coating composition tends to have insufficient stability, often suffering reduction of application suitability.

The hydroxyl-containing monomer (b3) includes those listed as the hydroxyl-containing monomers under the group (2) of the comonomers (a4) with respect to the preparation of the synthetic rubber polymer. Examples of preferred hydroxyl-containing monomers (b3) are 2-hydroxyethyl acrylate and 2-hydroxyethyl methacrylate. The copolymerization ratio of the monomer (b3) should be 1.5 to 15% by weight as described above and is preferably 2 to 10% by weight, still preferably 3 to 8% by weight. Too high a copolymerization ratio exceeding the upper limit makes it difficult to obtain a thick coating film due to liability to cracking on heat drying the coating film. Too low a copolymerization ratio below the lower limit tends to lead to reduction of reusability of the resulting waterborne coating composition.

Examples of the comonomer (b4) are listed below.

(1) Acrylic Esters other than the Monomers (b 1) and Methacrylic Esters

Methyl acrylate, ethyl acrylate, n-propyl acrylate, isopropyl acrylate, isobutyl acrylate, t-butyl acrylate, tridecyl acrylate, stearyl acrylate, and oleyl acrylate (methyl acrylate is preferred); methyl methacrylate, ethyl methacrylate, n-propyl methacrylate, n-butyl methacrylate, isobutyl methacrylate, t-butyl methacrylate, n-octyl methacrylate, 2-ethylhexyl methacrylate, cyclohexyl methacrylate, and benzyl methacrylate (methyl methacrylate is preferred).

(2) Ethylene Monomers other than Acrylic or Methacrylic Esters

Saturated fatty acid vinyl esters, e.g., vinyl formate, vinyl acetate, vinyl propionate, and Versatic Acid™ vinyl ester (with vinyl acetate being preferred); aromatic vinyl monomers, e.g., styrene, α-methylstyrene, and vinyltoluene (with styrene being preferred); vinyl cyanide monomers, e.g., acrylonitrile and methacrylonitrile (acrylonitrile being preferred); monoolefin monomers, e.g., ethylene, propylene, n-butylene, and isobutylene; maleic or fumaric diesters, e.g., dimethyl maleate, di-n-butyl maleate, di-2-ethylhexyl maleate, di-n-octyl maleate, dimethyl fumarate, di-n-butyl fumarate, di-2-ethylhexyl fumarate, di-n-octyl fumarate, di-n-butyl itaconate, di-2-ethylhexyl itaconate, and di-n-octyl itaconate.

(3) Monomers Listed under the Group (2) of the Comonomers (a4)

Amido- or substituted amido-containing monomers, amino- or substituted amino-containing monomers, hydroxyl-containing monomers, lower alkoxy-containing monomers, epoxy-containing monomers, mercapto-containing monomers, monomers having a silicon-containing group, and monomers having two or more radical polymerizable unsaturated groups.

From the standpoint of availability, ease of emulsion polymerization, and the like, preferred of these comonomers (b4) are those listed above under the groups (1) and (2), particularly methyl methacrylate, styrene, and acrylonitrile. These monomers can be used either individually or as a combination of two or more thereof.

The copolymerization ratio of the monomer (b4) should be 8.2 to 48.2% by weight as stated and is preferably 9.5 to 37.5% by weight, still preferably 12 to 26% by weight. Too high a copolymerization ratio more than the upper limit tends to result in reduced adhesion of the resulting coating film to a substrate. Too low a ratio below the lower limit tends to result in reduced anti-chipping performance of the coating film.

The "amount" of the repeating unit derived from the acrylic ester and/or the methacrylic ester in the acrylic polymer particles (B) is the total amount of the acrylic ester as the monomer (b1) and the acrylic ester and the methacrylic ester included under the group (1) of the monomer (b4).

The above-described acrylic polymer particles (B) can be prepared by emulsion polymerization (usually under atmospheric pressure) in the same manner as for the synthetic rubber polymer particles (A).

The Tg of the acrylic polymer particles (B), which are used as a vehicle component in combination with the synthetic rubber polymer particles (A), should be 0° C. or lower and desirably ranges −65° to −20° C., particularly −60° to −30° C. Too high a Tg exceeding the upper limit tends to result in reduced adhesion of the resulting coating film to a substrate. With a Tg of the lower limit or higher, the coating film exhibits excellent anti-chipping properties.

It is generally desirable that the acrylic polymer particles (B) have not more than 80% by weight, particularly 40 to 75% by weight, of a gel content. With the gel content at or below the upper limit, the resulting waterborne coating composition exhibits excellent reusability. With the gel content at or above the lower limit, a thick coating film can be obtained with little blistering on heat drying.

The acrylic (co)polymer emulsion prepared through emulsion polymerization of the monomers (b1) to (b4) can usually contain 10 to 70% by weight, preferably 30 to 65% by weight, still preferably 40 to 60% by weight, of the acrylic polymer particles (B) on a solid basis. It is advantageous that the acrylic (co)polymer emulsion has a viscosity usually of 10,000 mpa.s or less, particularly of from about 10 to about 5,000 mPa.s, as measured with a Brookfield rotational viscometer at 25° C. and 20 rpm.

The emulsion usually has a pH of 2 to 10, preferably 5 to 9. The pH is adjusted with, for example, aqueous ammonia, an aqueous amine solution or an aqueous alkali hydroxide solution.

The average particle size of the acrylic polymer particles (B) dispersed in the polymer emulsion is usually 1000 nm or smaller, preferably from 150 to 800 nm. The average particle size being at or below the upper limit, the resulting coating film has excellent adhesion to a substrate. The average particle size being at or above the lower limit, the coating composition provides a thick film with little blistering on heat drying. The particle size of the acrylic polymer particles (B) can be controlled in the same manner as for the synthetic rubber polymer particles (A).

Waterborne Coating Composition:

The waterborne coating composition of the present invention is prepared by incorporating an inorganic filler into vehicle components, i.e., the synthetic rubber polymer particles (A) combined with the acrylic polymer particles (B).

The synthetic rubber polymer particles (A) are used in an amount of 50 to 90% by weight, preferably 55 to 85% by weight, still preferably 60 to 80% by weight, based on the total amount of the polymer particles (A) and (B) of the emulsions, i.e., on a solid basis. The acrylic polymer particles (B) are used in an amount of 10 to 50% by weight, preferably 15 to 45% by weight, still preferably 20 to 40% by weight, based on the total amount of the polymer particles (A) and (B) of the emulsions, i.e., on a solid basis. Where the compounding ratio of the synthetic rubber polymer particles (A) is lower than the lower limit, that is, where the compounding ratio of the acrylic polymer particles (B) is more than the upper limit, the resulting coating film tends to have reduced anti-chipping properties. Where, on the other hand, the compounding ratio of the synthetic rubber polymer particles (A) is higher than the upper limit, that is, where the compounding ratio of the acrylic polymer particles (B) is lower than the lower limit, the resulting waterborne coating composition tends to have reduced reusability.

If desired, the waterborne coating composition of the present invention can contain (C) urethane resin particles, whereby the coating film will have increased adhesion to a polar substrate, such as a cationically electrocoated steel plate. The urethane resin particles (C) can usually be incorporated in an amount of less than about 30 parts by weight per 100 parts by weight of the total of the synthetic rubber particles (A) and the acrylic polymer particles (B) on a solid basis.

Useful emulsions containing the urethane resin particles (C) that can be used if desired include those commercially available under the trade names of SF 150HS and SF 420 (both from Dai-ichi Kogyo Seiyaku Co., Ltd.), HUX-320 and HUX-290N (both from Asahi Denka Co., Ltd.)

If necessary, the waterborne coating composition of the invention can further contain an isocyanate derivative as a crosslinking agent. Presence of an isocyanate derivative brings about further improvements on water resistance and adhesion to a substrate of the resulting coating film.

Useful isocyanate derivatives include aziridine compounds and blocked isocyanates, both of which are preferably water dispersible.

The aziridine compounds include reaction products between a polyisocyanate compound and ethyleneimine. The polyisocyanate compound includes aromatic polyisocyanate compounds, e.g., tolylene diisocyanate and diphenylmethane diisocyanate, aliphatic polyisocyanate compounds, e.g., 1,6-hexamethylene diisocyanate, and alicyclic polyisocyanate compounds, e.g., methylcyclohexane diisocyanate, dicyclohexylmethane diisocyanate, and isophorone diisocyanate. Also included are dimers or trimers of these isocyanate derivatives and adducts of the isocyanate derivatives with a di- or polyols, such as trimethylolpropane.

Commercially available aziridine compounds which are water-dispersible and suitably used in the present invention include SU-125F from Meisei Chemical Works, Ltd. and DZ-22E from Nippon Shokubai Co., Ltd.

The blocked isocyanates include those obtained by addition of a volatile low-molecular active hydrogen compound to the above-recited polyisocyanate compounds.

Commercially available blocked isocyanates which are water-dispersible and suitably used in the present invention include DM-30 and DM-60 both from Meisei Chemical Works, Ltd. and Elastron BN-69, Elastron BN-44, and Elastron BN-08 all from Dai-ichi Kogyo Seiyaku Co., Ltd.

Preferred of these isocyanate derivatives are aziridine compounds in view of their small temperature dependence of crosslinking reaction, the film thickness reachable without involving blisters, and the achievable improvements on wet anti-chipping performance and adhesion to a substrate of the resulting coating film.

The amount of the isocyanate derivative to be compounded is usually up to about 10 parts by weight in terms of an active ingredient per 100 parts by weight of the fine polymer particles present in the waterborne coating composition of the invention (i.e., the total of the synthetic rubber polymer particles (A) and the acrylic polymer particles (B) as essential components).

If desired, the composition of the present invention can further contain an appropriate crosslinking agent other than the isocyanate derivatives.

Useful crosslinking agents other than the isocyanate derivatives include:
(i) Water-soluble polyvalent metal salts, such as zinc salts, e.g., zinc acetate, zinc formate, zinc sulfate, and zinc chloride; aluminum salts, e.g., aluminum acetate, aluminum nitrate, and aluminum sulfate; calcium salts, e.g., calcium acetate, calcium formate, calcium chloride, calcium nitrate, and calcium sulfite; barium salts, e.g., barium acetate, barium chloride, and barium sulfite; magnesium salts, e.g., magnesium acetate, magnesium formate, magnesium chloride, magnesium sulfate, magnesium nitrate, and magnesium sulfite; lead salts, e.g., lead acetate and lead formate; nickel salts, e.g., nickel acetate, nickel chloride, nickel nitrate, and nickel sulfate; manganese salts, e.g., manganese acetate, manganese chloride, manganese sulfate, and manganese nitrate; and copper salts, e.g., copper chloride, copper nitrate, and copper sulfate;
(ii) Water-soluble epoxy resins, such as glycerol diglycidyl ether; and
(iii) Water-soluble melamine resins, such as methylol melamine; and methylol melamine with part of its hydroxyl groups etherified with methyl alcohol, ethyl alcohol, n-butyl alcohol, etc.

The amount of these crosslinking agents to be used is usually 0 to 10 parts by weight, preferably 2 to 8 parts by weight, still preferably 3 to 6 parts by weight, per 100 parts by weight of the fine polymer particles of the coating composition, taking into consideration minimizing change in viscosity of the resulting coating composition with time.

The aqueous medium used in the waterborne coating composition of the invention has its origin in the above-described emulsions. It is usually water but may sometimes a mixed solvent of water and a water-miscible organic solvent.

The waterborne coating composition of the present invention essentially contains fine polymer particles comprising the synthetic rubber polymer particles (A) and the acrylic polymer particles (B) and an inorganic filler. The inorganic filler is used as an extender and for the purpose of film hardness adjustment, blister prevention, and the like. Usable inorganic fillers include substantially water-insoluble to sparingly water-soluble inorganic powders, such as calcium carbonate, silica, alumina, kaolin, clay, talc, diatomaceous earth, mica, aluminum hydroxide, glass powder, barium sulfate, and magnesium carbonate.

The amount of the inorganic filler to be compounded is subject to wide variation depending on the kind of the inorganic filler and the physical properties expected of the coating composition. It usually ranges 100 to 390 parts by weight, preferably 120 o 380 parts by weight, still preferably 150 to 320 parts by weight, per 100 parts by weight of the total of the fine polymer particles present in the composition.

It is generally desired for the inorganic filler to have an average particle size of about 0.5 to about 50 µm, particularly 1 to about 30 µm.

The waterborne coating composition can further contain anti-corrosion pigments, coloring pigments, crosslinking agents, and so forth according to necessity as with ordinary coating compositions.

The anti-corrosion pigments include red lead oxide; chromic acid metal salts, e.g., zinc chromate, barium chromate, and strontium chromate; phosphoric acid metal salts, e.g., zinc phosphate, calcium phosphate, aluminum phosphate, titanium phosphate, silicon phosphate, and orthophosphates or condensed phosphates of these metals; molybdic acid metal salts, e.g., zinc molybdate, calcium molybdate, calcium zinc molybdate, potassium zinc molybdate, potassium zinc phosphomolybdate, and potassium calcium phosphomolybdate; boric acid metal salts, e.g., calcium borate, zinc borate, barium borate, barium metaborate, and calcium metaborate. Preferred of these anti-corrosion pigments are non-toxic or low-toxic ones, such as phosphoric acid metal salts, molybdic acid metal salts, and boric acid metal salts.

The anti-corrosion pigment is usually used in an amount of up to 50 parts by weight, preferably 5 to 30 parts by weight, per 100 parts by weight of the fine polymer particles in the waterborne coating composition.

The coloring pigments include organic or inorganic ones, such as titanium oxide, carbon black, red oxide, Hanza Yellow, Benzidine Yellow, Phthalocyanine Blue, and Quinacridone Red. The coloring pigment is usually used in an amount of up to 10 parts by weight, preferably 0.5 to 5 parts by weight, per 100 parts by weight of the fine polymer particles in the waterborne coating composition.

The particle size of the anti-corrosion or coloring pigments is preferably in the range of from 1 to 50 µm in view of the smoothness, etc. of the coating film formed of the resulting waterborne coating composition.

If desired, the waterborne coating composition of the invention can further contain dispersants including inorganic ones (e.g., sodium hexametaphosphate and sodium tripolyphosphate) and organic ones (e.g., Nopcosperse 44C, a polycarboxylic acid type dispersant available from San Nopco Ltd.); defoaming agents, e.g., of silicone type; thickeners or viscosity modifiers, such as polyvinyl alcohol, cellulose derivatives, polycarboxylic acid resins, and surface active agents; organic solvents, e.g., ethylene glycol, butyl cellosolve, butyl carbitol, and butyl carbitol acetate; antioxidants; antiseptics or antifungals; ultraviolet absorbers; antistatics; and so forth.

While not limiting, the waterborne coating composition of the present invention usually have a solids content of about 40 to 90% by weight, preferably about 50 to 85% by weight, still preferably about 60 to 80% by weight, a pH of 7 to 11, preferably 8 to 10, and a viscosity of about 3,000 to 100,000 mPa.s, preferably about 5,000 to 50,000 mpa.s, measured with a Brookfield rotational viscometer at 25° C. and 20 rpm.

The substrates to which the waterborne coating composition of the present invention is applied include, but are not limited to, steel plates; plated steel plates, such as lead-tin alloy plated steel plates (teme steel sheets), tin plated steel plates, aluminum plated steel plates, tin-zinc plated steel plates, lead plated steel plates, chromium plated steel plates, and nickel plated steel plates; and coated steel plates such as electrocoated steel plates. In particular, the waterborne coating composition of the invention exhibits excellent adhesion to aluminum plated steel plates, tin-zinc plated steel plates, etc. that have recently been supplanting terne steel sheets because of the lead toxicity problem in the manufacture of automobiles.

The waterborne coating composition of the invention is especially suitable for coating an electrocoated surface, an intermediate coat, a top coat, etc. of workpieces machined from the above-recited blank substrates by sheet metal working such as pressing or workpieces welded together into various automotive parts, such as automotive exterior sheet-metal worked parts including gas tanks, lower body panels, wheel housings, front aprons, and rear aprons.

The waterborne coating composition of the invention can be applied by coating techniques known per se, such as brush coating, spray coating, and roller coating. Typically, airless spray coating is suitable.

The coating thickness typically ranges from about 200 to 800 μm, preferably about 300 to 600 μm, while varying depending on the use of the substrate. The coating film can be dried by, for example, spontaneous drying or heat drying. In general, a low temperature baking type waterborne coating composition is preferably baked in a heating oven at a temperature of about 60 to 100° C., and drying of a high temperature baking type one is conveniently carried out by preliminary drying at about 60 to 100° C. followed by baking in a heating oven at a temperature of about 120 to about 160° C.

The present invention will now be illustrated in greater detail with reference to Examples. In Examples and Comparative Examples, test pieces were prepared and tested in accordance with the following methods.

(1) Preparation of Test Pieces

An aluminum plated steel plate (100 mm×200 mm×0.8 mm, available from Nippon Steel Corp.; hereinafter referred to as an Al steel plate) was cleaned with a thinner. A coating composition was applied to the Al steel plate by airless spraying to give a prescribed dry thickness, allowed to stand at room temperature for 10 minutes, preliminarily dried in a hot air circulating dryer at 80° C. for 15 minutes, and finally heat treated at 120° C. for 30 minutes.

Additional test pieces for evaluating adhesion to substrate were prepared in the same manner, except for replacing the Al steel plate with a tin-zinc plated steel plate (hereinafter referred to as an Sn/Zn steel plate) or a teme steel plate (hereinafter referred to as a Pb/Sn steel plate), both available from Nippon Steel Corp.

(2) Airless Sprayability

A coating composition was sprayed onto the Al steel plate treated as described in (1) above with commercially available airless pump and spray gun from a distance of 30 cm with a liquid pressure of 90 kg/cm$^2$ at the gun tip. Airless sprayability was evaluated according to the following standard taking the spray coated width as a parameter.

A: 30 cm or wider
B: 25 to 30 cm
C: 20 cm or narrower (3) Reusability

A coating composition was spray applied under the same gun tip pressure and spray distance conditions as in (2) above to give a wet coating thickness of at least 1000 μm. The coated substrate was allowed to stand under constant temperature and humidity conditions of 25° C. and 50% RH for at least 2 hours. The coat was then scraped off, collected, and diluted with deionized water to have its viscosity adjusted. The resulting coating composition was tested and evaluated for sprayability in the same manner as in (2).

(4) Blistering Critical Film Thickness

In spray coating the Al steel plate in (1) above, the coating thickness was varied to give various dry thicknesses. The maximum thickness of the film that did not develop blisters on drying was taken as a blistering critical film thickness.

(5) Cracking Critical Film Thickness

In spray coating the Al steel plate in (1) above, the coating thickness was varied to give various dry thicknesses. The maximum thickness of the film that did not develop cracks on drying was taken as a cracking critical film thickness.

(6) Adhesion to Substrate Testing

Three kinds of test pieces prepared in (1) above with a dry coating thickness of about 300 μm were left to stand under a constant temperature of about 25° C. for 16 hours. The coat was cross-cut along two series of lines at right angles with 1 mm spacing to a depth reaching the substrate with a cross cut guide (available from Cotec Co., Ltd.) and a cutter to obtain a pattern of 100 squares in a grid area of 1 cm$^2$. A 24 mm wide cellophane tape (from Nichiban Co., Ltd.) was stuck to the squares and swiftly peeled off at a peel angle of 180°. The number of the squares remaining on the substrate was counted and expressed per 100.

(7) Anti-Chipping Performance Testing (7-1) Dry Anti-Chipping Performance

A test piece prepared in (1) by coating the Al steel plate to a dry thickness of about 300 μm was left to stand at a constant temperature of about 25° C. for 16 hours. The coat was cut to make a cross, each line of which was about 5 cm long, to a depth reaching the substrate with a cutter. The test piece with the cross was fixedly set at 60° from horizontal, and nuts (M-6) were successively dropped in a vertical direction from a height of 2 m (from the coated surface) onto the cross mark through a polyvinyl chloride pipe (diameter: 25 mm). The anti-chipping performance was evaluated by the total weight of the nuts dropped which caused the substrate to be exposed.

(7-2) Wet Testing

A test piece prepared in (1) by coating the Al steel plate to a dry thickness of about 300 μm was left to stand at a constant temperature of about 25° C. for 16 hours. The test piece was immersed in deionized water at about 40° C. for 7 days, wiped to remove attached water, and allowed to stand at 25° C. for 3 hours. A cut of crossing lines was made in the same manner as in (7-1), and the test piece was tested for anti-chipping performance in the same manner as in (7-1).

(8) Low Temperature Impact Resistance Testing

A test piece prepared in (1) by coating the Al steel plate to a dry thickness of about 300 μm was left to stand at a constant temperature of about 25° C. for 16 hours and then at a constant temperature of −30° C. for at least 3 hours. The thus conditioned test piece was subjected to Du Pont impact test in accordance with JIS K-5400 at that temperature. The test was carried out as follows. An impact core and a receiver both having a radius of 6.35±0.03 mm were attached to a tester. A specimen was pinched between the impact core and the receiver with the coated face upwards. A weight having a mass of 500±1 g was dropped on the impact core from a height of 50 cm. The coat was observed with the naked eye, and the degree of damage was rated according to the following standard.

AA: No change.
A: Small cracks developed slightly.
B: Small cracks developed considerably.
C: Big cracks developed.

Preparation of Synthetic Rubber Polymer Emulsions:

PREPARATION EXAMPLE A1

In an autoclave equipped with a stirrer, a thermometer, and a raw material feeder were put 100 parts by weight of deionized water, 0.3 part by weight of sodium dodecylbenzenesulfonate, 0.2 part by weight of sodium hydrogencarbonate, 1.0 part by weight of potassium persulfate, 1.0 part by weight of t-dodecylmercaptan, and monomers consisting of 65 parts by weight of butadiene (Bd), 22 parts by weight of styrene (St), 5 parts by weight of methyl methacrylate (MMA), 5 parts by weight of acrylonitrile (AN), and 3 parts by weight of acrylic acid (AA). After thorough stirring, the mixture was subjected to polymerization reaction at 65° C. After completion of the polymerization, the resulting polymer emulsion was adjusted to pH of about 6 with an aqueous sodium hydroxide. Unreacted monomers, etc. were removed and collected by steam distillation, and the residual polymer emalsion was adjusted to a solids content of 50% by weight to obtain a synthetic rubber polymer emulsion having a pH of 6.1, a viscosity of 500 mpa.s (measured with a Brookfield viscometer at 25° C. and 20 rpm, hereinafter the same), and an average particle size of 160 mm. The synthetic rubber polymer particles had a Tg of −40° C. and a gel content of 85% by weight.

PREPARATION EXAMPLE A2

A synthetic rubber polymer emulsion was prepared in the same manner as in Preparation Example A1, except for changing the amount of t-dodecylmercaptan to 1.5 parts by weight. The properties of the resulting synthetic rubber polymer emulsion, i.e., pH, viscosity, and particle size, and the Tg and gel content of the polymer particles are shown in Table 1.

PREPARATION EXAMPLES A3 TO A5

Synthetic rubber polymer emulsions were prepared in the same manner as in Preparation Example A1, except that the monomers Bd (65 parts) and St (22 parts) were changed as shown in Table 1 for changing the Tg. The properties of the resulting synthetic rubber polymer emulsions and the Tg and gel content of the polymer particles are shown in Table 1.

PREPARATION EXAMPLES A6 TO A8

Synthetic rubber polymer emulsions were prepared in the same manner as in Preparation Example A1, except that the monomers Bd (65 parts), St (22 parts), MMA (5 parts), AN (5 parts), and AA (3 parts) were changed as shown in Table 1. The properties of the resulting synthetic rubber polymer emulsions and the Tg and gel content of the polymer particles are shown in Table 1.

Abbreviations for monomers shown in Table 1 have the following meanings.
Bd: butadiene
St: styrene
MMA: methyl methacrylate
AN: acrylonitrile
AA: acrylic acid
IA: itaconic acid

TABLE 1

| Prepn. Example No. | Monomer Composition (wt %) | | | | | | | Synthetic Rubber polymer Emulsion | | | Synthetic Rubber Polymer | |
|---|---|---|---|---|---|---|---|---|---|---|---|---|
| | (a1) | (a2) | | | (a3) | | | | Viscosity | Particle | | Gel Content |
| | Bd | St | MMA | AN | AA | IA | pH | (mPa·s) | Size (nm) | Tg (° C.) | (wt %) |
| A1 | 65 | 22 | 5 | 5 | 3 | — | 6.1 | 500 | 160 | −40 | 85 |
| A2 | 65 | 22 | 5 | 5 | 3 | — | 6.3 | 420 | 190 | −43 | 61 |
| A3 | 44 | 48 | 5 | — | 3 | — | 6.2 | 450 | 180 | −10 | 81 |
| A4 | 58 | 29 | 5 | 5 | 3 | — | 6.1 | 380 | 190 | −30 | 82 |
| A5 | 73 | 14 | 5 | 5 | 3 | — | 6.3 | 360 | 200 | −50 | 80 |
| A6 | 66 | 12.5 | 10 | 10 | — | 1.5 | 6.0 | 720 | 140 | −40 | 87 |
| A7 | 66 | 11 | 20 | — | 3 | — | 6.2 | 830 | 130 | −40 | 86 |
| A8 | 66 | 31 | — | — | 3 | — | 5.9 | 580 | 160 | −40 | 82 |

Preparation of Acrylic Polymer Emulsions:

PREPARATION EXAMPLE B1

In a reaction vessel equipped with a stirrer, a reflux condenser, a thermometer, and a raw material feeder were put 94 parts by weight of deionized water, 1.0 part by weight of sodium dodecylbenzenesulfonate, and 1.0 part by weight of ammonium polyoxyethylene lauryl ether sulfate. The mixture was heated to 70° C. in a nitrogen stream. A hundred parts by weight of a monomer mixture consisting of 75 parts by weight of 2-ethylhexyl acrylate (HEA), 2 parts by weight of acrylic acid (AA), 4 parts by weight of 2-hydroxyethyl methacrylate (HEMA), 10 parts by weight of St, and 9 parts by weight of MMA and 6 parts by weight of a 5 wt % aqueous solution of ammonium persulfate were continuously fed into the reaction vessel over a period of 3 hours. After the mixture was maintained at that temperature for 2 hours, an adequate amount of about 25 wt % aqueous ammonia was added thereto to obtain an acrylic polymer emulsion having a solids content of about 50 wt %, a pH of 7.0, a viscosity of 680 mPa.s, and an average particle size of 180 nm. The Tg and the gel content of the acrylic polymer particles were −50° C. and 60 wt %, respectively.

PREPARATION EXAMPLE B2

An acrylic polymer emulsion having a solids content of about 50 wt %, a pH of 6.8, a viscosity of 2510 mPa.s, and an average particle size of 120 nm was prepared in the same manner as in Preparation Example B1, except for increasing the amount of sodium dodecylbenzenesulfonate. The Tg and the gel content of the acrylic polymer particles were −50° C. and 48 wt %, respectively.

PREPARATION EXAMPLES B3 AND B4

Acrylic polymer emulsions having different gel contents were prepared in the same manner as in Preparation Example B1, except for increasing the amount of the 5 wt % aqueous ammonium persulfate solution. The solids content, pH, viscosity and average particle size of the resulting acrylic polymer emulsions and the Tg and gel content of the acrylic polymer particles are shown in Table 2.

PREPARATION EXAMPLES B5 TO B9

Acrylic polymer emulsions having different Tg's were prepared in the same manner as in Preparation Example B1, except that the monomer mixture comprising HEA 75 parts, AA 2 parts, HEMA 4 parts, St 10 parts, and MMA 9 parts was replaced with a monomer mixture having the composition shown in Table 2. The solids content, pH, viscosity and average particle size of the resulting acrylic polymer emulsions and the Tg and gel content of the acrylic polymer particles are shown in Table 2.

PREPARATION EXAMPLES B10 AND B11

Acrylic polymer emulsions having a Tg of about −50° C. were prepared in the same manner as in Preparation Example B1, except for replacing 2 parts by weight of AA with 0.1 part by weight or 8 parts by weight of AA and adjusting the amounts of EHA, MMA and St accordingly. The solids content, pH, viscosity and average particle size of the resulting acrylic polymer emulsions and the Tg and gel content of the acrylic polymer particles are shown in Table 2.

PREPARATION EXAMPLES B12 AND B13

Acrylic polymer emulsions having a Tg of about −50° C. were prepared in the same manner as in Preparation Example B1, except for replacing 4 parts by weight of HEMA with 1 part by weight or 15 parts by weight of HEMA and adjusting the amounts of EHA, MMA and St accordingly. The solids content, pH, viscosity and average particle size of the resulting acrylic polymer emulsions and the Tg and gel content of the acrylic polymer particles are shown in Table 2.

TABLE 2

| Prepn. Example No. | Monomer Composition (wt %) | | | | | | Acrylic Polymer Emulsion | | | | Acrylic Polymer | |
|---|---|---|---|---|---|---|---|---|---|---|---|---|
| | (b1) | | (b2) | (b3) | (b4) | | Solids | | Particle | | | Gel |
| | EHA | BA | AA | HEMA | MMA | St | Content (wt %) | pH | Viscosity (mP·s) | Size (nm) | Tg (°C.) | Content (wt %) |
| B1 | 75 | — | 2 | 4 | 9 | 10 | 50 | 7.0 | 680 | 180 | −50 | 60 |
| B2 | 75 | — | 2 | 4 | 9 | 10 | 50 | 6.8 | 2510 | 120 | −50 | 48 |
| B3 | 75 | — | 2 | 4 | 9 | 10 | 50 | 7.1 | 980 | 140 | −50 | 30 |
| B4 | 75 | — | 2 | 4 | 9 | 10 | 50 | 7.2 | 210 | 240 | −50 | 90 |
| B5 | 35 | — | 2 | 4 | 39 | 20 | 50 | 6.9 | 1050 | 150 | +10 | 51 |
| B6 | 53 | — | 2 | 4 | 31 | 10 | 50 | 7.2 | 880 | 170 | −20 | 57 |
| B7 | 67 | — | 2 | 4 | 17 | 10 | 50 | 7.0 | 450 | 210 | −40 | 61 |
| B8 | — | 87 | 2 | 4 | 2 | 5 | 50 | 7.2 | 920 | 170 | −45 | 54 |
| B9 | 89 | — | 2 | 4 | 5 | — | 50 | 7.0 | 380 | 230 | −65 | 65 |
| B10 | 75 | — | 0.1 | 4 | 10.9 | 10 | 50 | 7.5 | 210 | 200 | −50 | 45 |
| B11 | 76 | — | 8 | 4 | 8 | 4 | 50 | 4.5 | 510 | 240 | −50 | 62 |
| B12 | 76 | — | 2 | 1 | 11 | 10 | 50 | 7.1 | 340 | 180 | −50 | 46 |
| B13 | 73 | — | 2 | 15 | 6 | 4 | 50 | 6.9 | 1560 | 140 | −50 | 65 |

Preparation of Waterborne Coating Compositions:

EXAMPLE 1

A hundred and forty parts by weight (about 70 parts by weight on a solid basis) of the synthetic rubber polymer emulsion prepared in Preparation Example A1 and 60 parts by weight (about 30 parts by weight on a solid basis) of the acrylic polymer emulsion prepared in Preparation Example B1 were used as a synthetic rubber polymer emulsion (A) and an acrylic polymer emulsion (B), respectively. In the mixed emulsion were uniformly dispersed 2.0 parts by weight (about 0.88 part by weight on a solid basis) of Nopcosperse 44C (a polycarboxylic acid type dispersant, from San Nopco Ltd.), 215 parts by weight of calcium carbonate powder SL-700 (from Takehara Kagaku Kogyo K K; average particle size: 4.5 μm) as an inorganic filler, 15 parts by weight of barium metaborate as an anticorrosion pigment, and 3 parts by weight of carbon black as a coloring pigment by means of a disper. Two parts by weight of Adekanol UH-472 (from Asahi Denka Co., Ltd.) was added to the dispersion as a thickener, followed by stirring. Finally, the viscosity of the mixture was adjusted to 20,000 to 25,000 mpa.s by addition of Adekanol UH472 and deionized water to give a waterborne coating composition having a PWC of 70% by weight and a solids content of 75.5% by weight.

The resulting waterborne coating composition was tested for various physical properties. The compounding formulation and characteristic values of the waterborne coating composition are shown in Table 3, and the results of the tests for physical properties are shown in Table 4.

EXAMPLES 2 AND 3 AND COMPARATIVE EXAMPLES 1 AND 2

Waterborne coating compositions were prepared in the same manner as in Example 1, except for changing the ratio of the synthetic rubber polymer emulsion prepared in Preparation Example A1 and the acrylic polymer emulsion prepared in preparation Example B1 or using no acrylic polymer emulsion, and subjected to tests for various physical properties. The compounding formulation and characteristic values of the waterborne coating compositions are shown in Table 3, and the results of the tests for physical properties are shown in Table 4.

EXAMPLES 4 TO 9 AND COMPARATIVE EXAMPLE 3

Waterborne coating compositions were prepared in the same manner as in Example 1, except for replacing the synthetic rubber polymer emulsion prepared in Preparation Example A1 with each of the synthetic rubber polymer emulsions prepared in Preparation Examples A2 to A8, and subjected to tests for various physical properties. The compounding formulation and characteristic values of the waterborne coating compositions are shown in Table 3, and the results of the tests for physical properties are shown in Table 4.

EXAMPLES 10 TO 20 AND COMPARATIVE EXAMPLE 4

Waterborne coating composition were prepared in the same manner as in Example 1, except for replacing the acrylic polymer emulsion prepared in Preparation Example B1 with each of the acrylic polymer emulsions prepared in Preparation Examples B2 to A13, and subjected to tests for various physical properties. The compounding formulations and characteristic values of the waterborne coating compositions are shown in Table 3, and the results of the tests for physical properties are shown in Table 4.

TABLE 3

| | Compounding Formulation | | | | | | | | Waterborne Coating Composition | | |
|---|---|---|---|---|---|---|---|---|---|---|---|
| | Synthetic Rubber Polymer | | Acrylic Polymer | | Calcium Carbonate (part) | Barium Metaborate (part) | Carbon Black (part) | PWC (wt %) | Solids | | |
| Run No. | Kind (Prepn. Ex. No.) | Amount (part) | Kind (Prepn. Ex. No.) | Amount (part) | | | | | Content (wt %) | pH | Viscosity (mPa·s) |
| Ex. 1 | A1 | 70 | B1 | 30 | 215 | 15 | 3 | 70 | 75.5 | 9.2 | 23000 |
| Comp. Ex. 1 | A1 | 100 | — | — | 215 | 15 | 3 | 70 | 74.0 | 9.1 | 23500 |
| Ex. 2 | A1 | 90 | B1 | 10 | 215 | 15 | 3 | 70 | 75.2 | 9.2 | 24500 |
| Ex. 3 | A1 | 50 | B1 | 50 | 215 | 15 | 3 | 70 | 75.5 | 9.3 | 22000 |
| Comp. Ex. 2 | A1 | 40 | B1 | 60 | 215 | 15 | 3 | 70 | 76.0 | 9.2 | 20500 |
| Ex. 4 | A2 | 70 | B1 | 30 | 215 | 15 | 3 | 70 | 75.1 | 9.3 | 22000 |
| Comp. Ex. 3 | A3 | 70 | B1 | 30 | 215 | 15 | 3 | 70 | 75.9 | 9.1 | 21500 |
| Ex. 5 | A4 | 70 | B1 | 30 | 215 | 15 | 3 | 70 | 75.2 | 8.9 | 22500 |
| Ex. 6 | A5 | 70 | B1 | 30 | 215 | 15 | 3 | 70 | 75.3 | 9.2 | 22500 |
| Ex. 7 | A6 | 70 | B1 | 30 | 215 | 15 | 3 | 70 | 75.4 | 9.1 | 24000 |
| Ex. 8 | A7 | 70 | B1 | 30 | 215 | 15 | 3 | 70 | 75.3 | 9.3 | 24500 |
| Ex. 9 | A8 | 70 | B1 | 30 | 215 | 15 | 3 | 70 | 75.6 | 9.1 | 23500 |
| Ex. 10 | A1 | 70 | B2 | 30 | 215 | 15 | 3 | 70 | 74.5 | 9.0 | 21500 |
| Ex. 11 | A1 | 70 | B3 | 30 | 215 | 15 | 3 | 70 | 75.2 | 9.1 | 22000 |
| Ex. 12 | A1 | 70 | B4 | 30 | 215 | 15 | 3 | 70 | 75.4 | 9.2 | 21000 |
| Comp. Ex. 4 | A1 | 70 | B5 | 30 | 215 | 15 | 3 | 70 | 76.0 | 9.1 | 23000 |
| Ex. 13 | A1 | 70 | B6 | 30 | 215 | 15 | 3 | 70 | 75.3 | 9.3 | 23500 |
| Ex. 14 | A1 | 70 | B7 | 30 | 215 | 15 | 3 | 70 | 75.2 | 9.0 | 21500 |
| Ex. 15 | A1 | 70 | B8 | 30 | 215 | 15 | 3 | 70 | 75.2 | 9.2 | 24000 |
| Ex. 16 | A1 | 70 | B9 | 30 | 215 | 15 | 3 | 70 | 74.8 | 9.0 | 22000 |
| Ex. 17 | A1 | 70 | B10 | 30 | 215 | 15 | 3 | 70 | 75.2 | 9.1 | 23500 |
| Ex. 18 | A1 | 70 | B11 | 30 | 215 | 15 | 3 | 70 | 68.2 | 8.7 | 24500 |
| Ex. 19 | A1 | 70 | B12 | 30 | 215 | 15 | 3 | 70 | 75.3 | 9.2 | 22500 |
| Ex. 20 | A1 | 70 | B13 | 30 | 215 | 15 | 3 | 70 | 74.5 | 8.9 | 23000 |

*On solid basis

TABLE 4

Physical Properties of Coating Composition Film

| Run No. | Airless Sprayability | Reusability | Blistering Critical Thickness | Cracking Critical Thickness | Adhesion to Substrate (/100) | | | Anti-chipping | | Low-Temperature Flexing |
|---|---|---|---|---|---|---|---|---|---|---|
| | | | | | Al Steel Plate | Sn/Zn Steel Plate | Pb/Sn Steel Plate | Dry (kg) | Wet (kg) | |
| Ex. 1 | A | A | 700 | 700 | 100 | 100 | 100 | 40 | 30 | A |
| Comp. Ex. 1 | A | C | 750 | 750 | 70 | 80 | 60 | 30 | 15 | AA |
| Ex. 2 | A | B | 700 | 700 | 80 | 85 | 100 | 45 | 30 | AA |
| Ex. 3 | A | A | 600 | 600 | 90 | 90 | 100 | 30 | 25 | A |
| Comp. Ex. 2 | A | A | 550 | 550 | 100 | 90 | 80 | 20 | 5 | A |
| Ex. 4 | A | A | 600 | 600 | 100 | 100 | 100 | 25 | 18 | AA |
| Comp. Ex. 3 | A | A | 800 | 400 | 50 | 20 | 50 | 20 | 12 | C |
| Ex. 5 | A | A | 800 | 500 | 80 | 85 | 100 | 25 | 20 | B |
| Ex. 6 | A | A | 750 | 650 | 85 | 90 | 100 | 35 | 25 | A |
| Ex. 7 | A | A | 750 | 700 | 100 | 100 | 100 | 35 | 25 | A |
| Ex. 8 | A | A | 650 | 650 | 100 | 100 | 100 | 30 | 20 | A |
| Ex. 9 | A | A | 750 | 750 | 90 | 95 | 100 | 35 | 22 | A |
| Ex. 10 | A | A | 700 | 700 | 100 | 100 | 100 | 35 | 20 | A |
| Ex. 11 | A | B | 600 | 600 | 100 | 100 | 100 | 30 | 22 | A |
| Ex. 12 | A | B | 750 | 750 | 85 | 80 | 95 | 25 | 18 | A |
| Comp. Ex. 4 | A | A | 800 | 650 | 30 | 60 | 80 | 20 | 10 | C |
| Ex. 13 | A | A | 750 | 750 | 80 | 90 | 90 | 25 | 20 | A |
| Ex. 14 | A | A | 700 | 700 | 95 | 95 | 100 | 40 | 28 | A |
| Ex. 15 | A | A | 750 | 750 | 100 | 100 | 100 | 40 | 28 | A |
| Ex. 16 | A | A | 600 | 600 | 80 | 80 | 100 | 18 | 12 | AA |
| Ex. 17 | B | A | 750 | 700 | 90 | 90 | 100 | 35 | 20 | A |
| Ex. 18 | B | B | 600 | 600 | 100 | 100 | 100 | 40 | 18 | A |
| Ex. 19 | A | B | 650 | 650 | 90 | 90 | 100 | 35 | 25 | A |
| Ex. 20 | A | A | 750 | 600 | 100 | 100 | 100 | 45 | 32 | A |

INDUSTRIAL APPLICABILITY:

The waterborne coating composition according to the present invention is useful as, for example, a mastic coating, a sound proofing coating, a vibration damping coating or a caulking material, particularly as a coating for protecting exterior sheet metal parts of vehicles, especially automobiles, such as chassiz, gas tanks, and suspensions. It comprises (A) synthetic rubber polymer particles having a glass transition temperature of −20° C. or lower as a main vehicle component and (B) acrylic polymer particles having a glass transition temperature of 0° C. or lower as a secondary vehicle component.

Being so constructed, the waterborne coating composition of the present invention exhibits excellent airless sprayability. Even where a coating film of relatively large thickness, e.g., 600 μm or larger, is to be formed in a single pass, the applied coating develops neither blisters nor cracks during drying. A coating film of the coating composition exhibits excellent anti-chipping properties even with a relatively small thickness for that kind of coating films, for instance about 300 μm. Lead-tin alloy steel plates, which have been employed as a metal substrate, have recently been avoided in view of the environmental problem of lead. However, lead-free substrates that have been supplanting these lead-containing substrates, such as aluminum plated steel plates and tin-zinc plated steel plates, are apt to have insufficient adhesion to a coating film compared with the conventional lead-tin alloy steel plates. The waterborne coating composition of the invention provides a coating film having high adhesion to such new substrate materials.

An additional outstanding characteristic feature of the waterborne coating composition of the invention resides in that left-over after use does not need to be disposed of and can be made reusable by addition of a fresh one.

The invention claimed is:

1. A waterborne anti-chipping coating composition for automobiles comprising fine polymer particles dispersed in an aqueous medium and an inorganic filler, characterized in that the fine polymer particles comprise:
    (A) 50 to 90% by weight of synthetic rubber polymer particles containing 50 to 90% by weight of a repeating unit derived from a conjugated diolefin monomer and having a glass transition temperature of −20° C. or lower and
    (B) 10 to 50% by weight of acrylic polymer particles having a gel content of 40–75% by weight, containing 50% by weight or more of a repeating unit derived from an acrylic ester and/or a methacrylic ester and having a glass transition temperature of 0° C. or lower;
    wherein the synthetic rubber polymer particles are those produced by aqueous emulsion polymerization of the following monomers (a1) to (a4) under pressure:
    (a1) a conjugated diolefin monomer,
    (a2) a methacrylic ester monomer, a vinyl cyanide monomer and/or aromatic vinyl monomer and, if desired optionally,
    (a3) a monomer having a carboxyl group in the molecule thereof and, if desired,
    (a4) a monomer other than the monomers (a1), (a2), and (a3) and copolymerizable with the monomers (a1), (a2) and (a3);
    wherein the methacrylic ester monomer, the vinyl cyanide monomer and/or the aromatic vinyl monomer (a2) comprise at least two monomers selected from methyl methacrylate, acrylonitrile, and/or styrene; and
    wherein the synthetic rubber polymer particles have a gel content of 70 to 95% by weight.

2. The waterborne coating composition according to claim 1, wherein the conjugated diolefin monomer (a1) is butadiene.

3. The waterborne coating composition according to claim 1, wherein the methacrylic ester monomer, the vinyl cyanide monomer and/or the aromatic vinyl monomer (a2) are methyl methacrylate and acrylonitrile.

4. The waterborne coating composition according to claim 1, wherein the total copolymerization ratio of the methacrylic ester monomer, the vinyl cyanide monomer and/or the aromatic vinyl monomer (a2) ranges from 10 to 50% by weight based on the weight (100% by weight) of the synthetic rubber polymer particles.

5. The waterborne coating composition according to claim 1, wherein the copolymerization ratio of the monomer (a3) having a carboxyl group in the molecule thereof ranges from 0.3 to 10% by weight based on the weight (100% by weight) of the synthetic rubber polymer particles.

6. The waterborne coating composition according to claim 1, wherein the synthetic rubber polymer particles have a particle size ranging from 100 to 300 nm.

7. The waterborne coating composition according to claim 1, wherein the acrylic polymer particles are those produced by aqueous emulsion polymerization of the following monomers (b1) to (b4):

(b1) 50 to 90% by weight of an acrylic ester represented by formula (1):

$$H_2C=CR^1HCOOR^2 \qquad (1)$$

wherein $R^1$ represents H or a methyl group; and $R^2$ represents a straight-chain or branched alkyl group having 4 to 10 carbon atoms,
of which a homopolymer has a glass transition temperature (Tg) of $-50°$ C. or lower, (b2) 0.3 to 10% by weight of a monomer having a carboxyl group in the molecule thereof, (b3) 1.5 to 15% by weight of a monomer having a hydroxyl group in the molecule thereof, and (b4) 8.2 to 48.2% by weight of a comonomer other than the monomers (b1), (b2) and (b3) and copolymerizable with the monomers (b1), (b2) and (b3), the total of the monomers (b1) to (b4) being taken as 100% by weight.

8. The waterborne coating composition according to claim 1, wherein the acrylic polymer particles have a particle size of 1000 nm or smaller.

9. The waterborne coating composition according to claim 3, wherein the total copolymerization ratio of the methacrylic ester monomer, the vinyl cyanide monomer and/or the aromatic vinyl monomer (a2) ranges from 10 to 50% by weight based on the weight (100% by weight) of the synthetic rubber polymer particles.

10. The waterborne coating composition according to claim 3, wherein the methacrylic ester monomer, the vinyl cyanide monomer and/or the aromatic vinyl monomer (a2) comprise methyl methacrylate, acrylonitrile, and styrene.

11. The waterborne coating composition according to claim 4, wherein the methacrylic ester monomer, the vinyl cyanide monomer and/or the aromatic vinyl monomer (a2) comprise methyl methacrylate, acrylonitrile, and styrene.

12. The waterborne coating composition according to claim 1, wherein the synthetic rubber polymer particles have a particle size ranging from 100 to 300 nm.

13. The waterborne coating composition according to claim 7, wherein the acrylic polymer particles have a particle size of 1000 nm or smaller.

14. A waterborne coating composition comprising polymer particles dispersed in an aqueous medium and an inorganic filler, characterized in that the polymer particles comprise:

(A) 50 to 90% by weight of synthetic rubber polymer particles having a gel content of 70–95% by weight, containing 50 to 90% by weight of a repeating unit derived from a conjugated diolefin monomer and having a glass transition temperature of $-20°$ C. or lower and (B) 10 to 50% by weight of acrylic polymer particles having a gel content of 40–75% by weight, containing 50% by weight or more of a repeating unit derived from an acrylic ester and/or a methacrylic ester and having a glass transition temperature of $0°$ C. or lower;

wherein the synthetic rubber polymer particles are polymers comprising the following monomers (a1) to (a4):

(a1) a conjugated diolefin monomer, (a2) a methacrylic ester monomer, a vinyl cyanide monomer and/or aromatic vinyl monomer and, optionally, (a3) a monomer having a carboxyl group in the molecule thereof and, optionally, (a4) a monomer other than the monomers (a1), (a2), and (a3) and copolymerizable with the monomers (a1), (a2) and (a3);

wherein the methacrylic ester monomer, the vinyl cyanide monomer and/or the aromatic vinyl monomer (a2) comprise at least two monomers selected from methyl methacrylate, acrylonitrile, and/or styrene, and wherein said acrylic polymer particles, and said synthetic rubber polymer particles are in combination in amounts to provide a waterborne antichipping coating composition.

15. The waterborne coating composition according to claim 14, wherein the synthetic rubber polymer particles are in an amount of 60–80% and the acrylic polymer particles are in an amount of 20–40% based on the total amount of polymer particles on a solid basis.

* * * * *